Sept. 17, 1940.   W. H. BASELT   2,215,064
FREIGHT CAR BRAKE
Filed Dec. 4, 1939   2 Sheets-Sheet 2
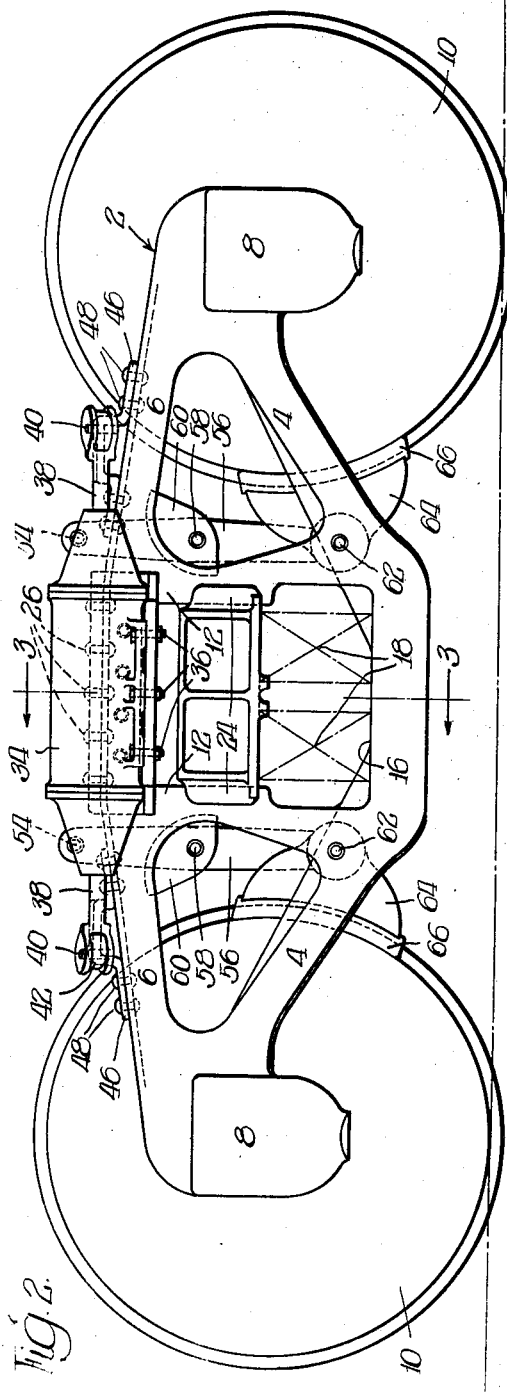
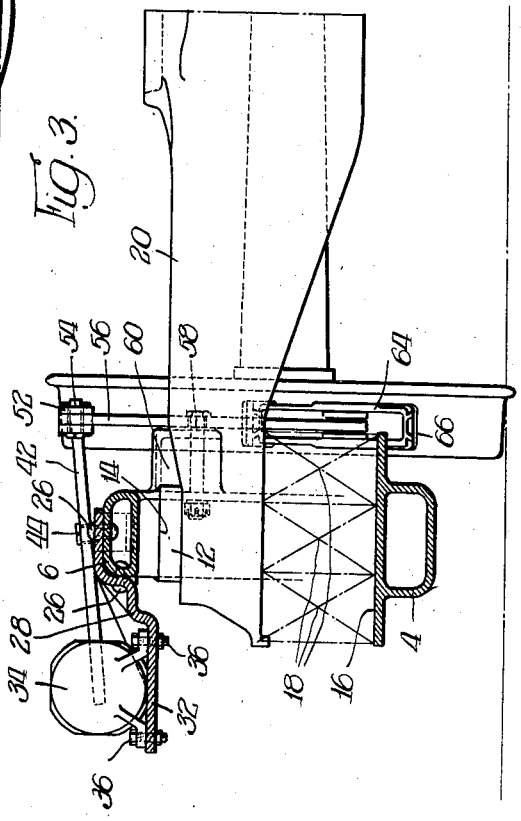
INVENTOR.
Walter H. Baselt,
BY
ATTORNEY.

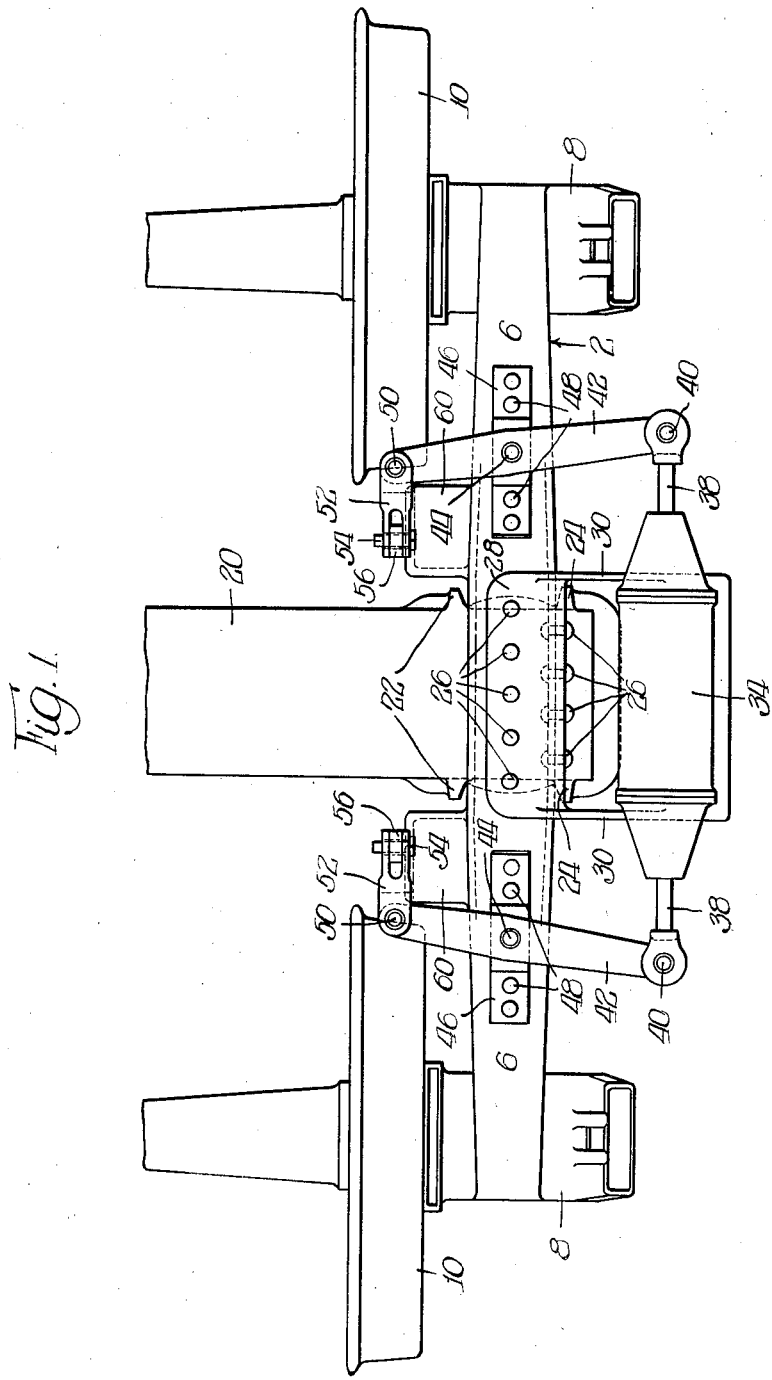

Patented Sept. 17, 1940

2,215,064

UNITED STATES PATENT OFFICE 2,215,064

FREIGHT CAR BRAKE

Walter H. Baselt, Chicago, Ill., assignor to American Steel Foundries, Chicago, Ill., a corporation of New Jersey Application December 4, 1939, Serial No. 307,359

20 Claims. (Cl. 188—53)

My invention relates to brake mechanism of a type commonly designated unit cylinder wherein the power means is mounted on the truck frame as distinguished from the car body.

An object of my invention is to design a four wheel truck braking arrangement of unit cylinder type wherein the double acting cylinder may be supported on a truss type side frame to operate the brake mechanism associated with the spaced wheels on one side of the truck.

My invention comprehends an arrangement wherein a brake hanger lever is supported on the inboard side of the truck side frame adjacent each wheel, and power means is supported at an intermediate point on the truck frame outboard thereof with an operative connection between said lever and said power means.

A different object of my invention is such an arrangement as that above described wherein the connection between the brake hanger lever inboard of the truck side frame and the power means outboard thereof is in the form of a horizontal lever at each end of the truck fulcrumed on said side frame and connected at its opposite ends respectively to said hanger lever and said power means.

My invention contemplates a brake arrangement for a four wheel truck having truss type side frames wherein a carrier bracket is supported on top of each side frame extending outwardly thereof as a means of support for double acting power means forming operating means for the rigging at each side of the truck.

In the drawings certain parts are omitted from some figures for the sake of clarity when said parts and their connections are better shown in other figures.

Figure 1 is a top plan view of the truck structure embodying my invention, only one-half of the truck being shown inasmuch as the brake arrangement is similar at opposite sides thereof.

Figure 2 is a side elevation of the truck and brake structure shown in Figure 1; and Figure 3 is a sectional view taken substantially in the transverse vertical plane bisecting the truck and as indicated by the line 3—3 of Figure 2.

Describing the structure in greater detail the truck comprises the side frame generally designated 2 having the tension member 4 and the compression member 6 merging at their ends with the integrally formed journal boxes 8, 8, forming the usual means of connection for the journal ends of the supporting wheel and axle assemblies 10, 10. Integrally joining the tension and compression members at spaced points are the guide columns 12, 12 forming with said members the bolster opening 14 at the bottom of which opening the tension member 4 is widened to form the spring seat 16 upon which may be positioned in the usual manner the resilient means diagrammatically indicated at 18, 18. The bolster 20 is seated upon the resilient means 18, the end of said bolster being retained in position within said bolster opening on top of the spring group by means of the inboard guide lugs 22, 22 and the outboard guide lugs 24, 24.

On top of each side frame and secured thereto as at 26, 26 as by means of rivets is the carrier bracket 28, said bracket having the spaced transverse arms 30, 30 merging with the horizontal plate 32 at the outer end of said bracket. On said plate 32 may be supported double acting power means or cylinders 34, 34 secured thereto as at 36, 36.

Projecting from each end of the power means 34 is a piston 38, the outer end of which has a pivotal connection as at 40 to the transversely arranged and substantially horizontal auxiliary or cylinder lever 42 which is fulcrumed intermediate its ends as at 44 from the bracket 46 secured as at 48, 48 on the compression member of the side frame.

The inner end of each cylinder lever 42 is pivotally connected as at 50 to the clevis means 52, the inner end of said clevis means having a pivotal connection as at 54 to the upper end of the hanger lever 56. The hanger lever 56 is fulcrumed intermediate its ends as at 58 from the bracket 60, said bracket being integrally formed with the side frame at the juncture of the compression member 6 and the column 12 and extending in an inboard direction therefrom. The lower end of each lever 56 pivotally supports as at 62 a brake head 64 and the associated brake shoes 86 for engagement with the inner periphery of the adjacent wheel.

As will be clearly apparent to those skilled in the art, actuation of the power means 34 causes the pistons 38, 38 to move outwardly from said cylinder thereby rotating the cylinder levers 42, 42 at opposite ends of the truck on their respective fulcrums 44, 44 and applying the brake shoes to the wheels at opposite ends of the truck by movement of the brake hanger levers 56, 56 connected at their upper ends to said cylinder levers. Release of power means causes the parts to move in reverse directions, thus removing the braking shoes from engagement with the wheels.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway truck, a truss side frame having a compression member and a tension member merging adjacent their ends, integral spaced columns forming therewith a bolster opening, power means mounted on said compression member outwardly of said opening, fulcrum means mounted on said compression member inboard of said frame at its junctures with said columns, supporting wheel and axle assemblies, and braking means for said wheels comprising cylinder levers fulcrumed intermediate their ends from said compression member adjacent opposite ends of said power means and operatively connected thereto, truck levers fulcrumed intermediate their ends from said fulcrum means respectively and operatively connected to adjacent cylinder levers, and brake heads and brake shoes supported at the lower ends of said truck levers for engagement with the peripheries of adjacent wheels.

2. In a railway truck, spaced truss side frames, each comprising a compression member, a tension member and spaced columns forming a bolster opening, a connecting bolster having its ends supported respectively in said openings and projecting therethrough, power means mounted on each compression member over said opening and outwardly thereof and having clearance from the adjacent bolster, supporting wheel and axle assemblies, and braking means for the wheels comprising cylinder levers fulcrumed from each compression member adjacent opposite ends of the power means and operatively connected thereto respectively, brake levers fulcrumed from each frame at opposite sides of the opening and operatively connected respectively to said cylinder levers, and brake heads and brake shoes supported at the lower ends of said brake levers for engagement with the peripheries of adjacent wheels.

3. In a four wheel truck, a truss side frame having a compression member, a tension member and spaced columns forming a bolster opening, power means supported on said compression member outboard of said frame, fulcrum means supported on said frame adjacent the juncture of said compression member and one of said columns inboard said frame, spaced supporting wheel and axle assemblies, braking means for said wheels, said braking means comprising cylinder levers fulcrumed on said compression member at opposite ends of said power means and operatively connected thereto, hanger levers pivoted intermediate their ends from said fulcrum means and operatively connected respectively to said cylinder levers, and brake heads and brake shoes supported at the lower ends of said hanger levers for engagement with the peripheries of adjacent wheels.

4. In a railway truck, spaced truss type side frames and a connecting bolster, supporting wheel and axle assemblies, each of said frames comprising a tension member, a compression member and integral columns forming a bolster opening, double acting power means mounted on each compression member outwardly of said opening, braking means for said wheels comprising cylinder levers fulcrumed on each compression member and operatively connected at opposite ends of adjacent power means, and brake levers fulcrumed intermediate their ends from said frames adjacent the junctures of the compression members with the columns, respectively, said brake levers having their upper ends connected to said cylinder levers respectively, and brake heads and brake shoes supported from the lower ends of said brake levers for engagement with the peripheries of adjacent wheels.

5. In a railway truck, spaced truss side frames, each comprising a compression member, a tension member and spaced columns forming a bolster opening, a connecting bolster having its ends supported respectively in said openings and projecting therethrough, power means mounted on each frame over said opening and outwardly thereof and having clearance from the adjacent bolster, supporting wheel and axle assemblies, and braking means for said wheels comprising cylinder levers fulcrumed intermediate their ends from each frame adjacent opposite ends of the power means and operatively connected thereto at their outer ends, brake levers fulcrumed from each frame inboard thereof at opposite sides of said opening and operatively connected at their upper ends to said cylinder levers respectively, and brake heads and brake shoes mounted on said brake levers.

6. In a four wheel truck, spaced truss type side frames, each comprising a tension member, a compression member and integral columns merging with said members to form a bolster opening, a bolster having its ends supported in said openings, supporting wheel and axle assemblies, braking means for said wheels, power means supported on each of said side frames, and an operative connection between each of said power means and the braking means at one side of said truck, said operative connection comprising a cylinder lever fulcrumed on said compression member and connected at one end to the piston of the adjacent power means, a hanger lever fulcrumed intermediate its ends from said side frame adjacent the juncture of the compression member and one of said columns, and a connection between said levers.

7. In a railway truck, a truss side frame having a compression member and a tension member merging adjacent their ends, integral spaced columns forming therewith a bolster opening, power means mounted on said compression member outwardly of said opening, fulcrum means mounted on said compression member inboard of said frame at its junctures with said columns, supporting wheel and axle assemblies, and braking means for said wheels comprising cylinder levers fulcrumed intermediate their ends from said compression member adjacent opposite ends of said power means and operatively connected thereto, and truck levers fulcrumed intermediate their ends from said fulcrum means respectively and operatively connected to said cylinder levers respectively.

8. In a railway truck, spaced truss type side frames, a connecting bolster, supporting wheels and axles, double acting power means mounted on each side frame outwardly thereof, fulcrum means mounted on each side frame inboard thereof at opposite sides of said bolster, and braking means for said wheels comprising cylinder levers operatively connected at their outer ends to opposite ends of each power means respectively and fulcrumed at intermediate points from said frame, truck levers connected at their upper ends to said cylinder levers respectively and pivoted intermediate their ends from adjacent fulcrum means, and brake heads and brake shoes supported at the lower ends of said brake levers for engagement with the peripheries of adjacent wheels.

9. In a railway truck, spaced truss type side frames, a connecting bolster, supporting wheels and axles, double acting power means mounted on each side frame outwardly thereof, fulcrum means mounted on each side frame inboard thereof at opposite sides of said bolster, braking means for said wheels comprising cylinder levers fulcrumed intermediate their ends from the top member of each frame and operatively connected at their outer ends respectively to opposite ends of adjacent power means, brake levers fulcrumed intermediate their ends from said fulcrum means and operatively connected to adjacent cylinder levers, and brake heads and brake shoes mounted at the lower ends of said truck lever for engagement with peripheries of adjacent wheels.

10. In a railway truck, spaced truss side frames, each comprising a compression member, a tension member and spaced columns forming a bolster opening, a connecting bolster having its ends supported respectively in said openings and projecting therethrough, power means mounted on each frame over said opening and outwardly thereof and having clearance from the adjacent bolster, supporting wheel and axle assemblies, and braking means for the wheels at each side of the truck comprising cylinder levers fulcrumed from the compression member adjacent opposite ends of the power means and operatively connected thereto respectively, and brake levers fulcrumed from each frame at opposite sides of said opening and operatively connected respectively to said cylinder levers.

11. In a railway truck, spaced truss type side frames, each comprising a tension member, a compression member and integral columns forming therewith a bolster opening, a bolster connecting said side frames, double acting power means mounted on each of said side frames outwardly of the bolster opening, cylinder levers fulcrumed on each of said frames adjacent opposite ends of the associated power means and operatively connected thereto respectively, truck levers fulcrumed from each of said frames at opposite sides of the bolster opening and connected at their upper ends respectively to said cylinder levers, and brake heads and brake shoes supported at the lower ends of said truck levers.

12. In a railway truck, a truss side frame having a compression member and a tension member merging adjacent their ends, integral spaced columns forming therewith a bolster opening, power means mounted on said compression member outwardly of said opening, fulcrum means mounted on said compression member inboard of said frame at its junctures with said columns, supporting wheel and axle assemblies, braking means for said wheels comprising cylinder levers fulcrumed on said compression member and operatively connected to opposite ends of said power means respectively, and hanger levers pivoted from said fulcrum means and operatively connected respectively to said cylinder levers.

13. In a four wheel truck, a truss side frame having a compression member, a tension member and spaced columns forming a bolster opening, power means supported on said compression member outboard of said frame, fulcrum means supported on said frame adjacent the juncture of said compression member and one of said columns inboard said frame, spaced supporting wheel and axle assemblies, braking means for said wheels, said braking means comprising cylinder levers fulcrumed on said compression member at opposite ends of said power means and operatively connected thereto, and hanger levers pivoted intermediate their ends from said fulcrum means and operatively connected respectively to said cylinder levers.

14. In a four wheel truck, a truss side frame having a compression member, a tension member and spaced columns forming a bolster opening, power means supported on said compression member outboard of said frame, fulcrum means supported on said frame adjacent the juncture of said compression member and one of said columns inboard said frame, spaced supporting wheel and axle assemblies, and braking means for said wheels, said braking means comprising a cylinder lever fulcrumed intermediate its ends on said compression member, a hanger lever fulcrumed intermediate its ends from said fulcrum means, and a connection between said levers.

15. In a railway truck, spaced truss type side frames, a connection bolster, supporting wheels and axles, double acting power means mounted on each side frame outwardly thereof, fulcrum means mounted on each side frame inboard thereof at opposite sides of said bolster, braking means for said wheels comprising cylinder levers fulcrumed intermediate their ends from the top member of each frame and operatively connected at their outer ends respectively to opposite ends of adjacent power means, and brake levers fulcrumed intermediate their ends from said fulcrum means and operatively connected to adjacent cylinder levers.

16. In a railway truck, spaced truss type side frames, a connecting bolster, supporting wheels and axles, double acting power means mounted on each side frame outwardly thereof, fulcrum means mounted on each side frame inboard thereof at opposite sides of said bolster, and independent braking means for the wheels at each side of said truck comprising cylinder levers fulcrumed from the frame and operatively connected at corresponding ends to opposite ends of the adjacent power means, brake levers fulcrumed from said frame and operatively connected at corresponding ends to said cylinder levers, and brake heads and brake shoes mounted on said brake levers.

17. In a railway truck, spaced truss type side frames, a connecting bolster, supporting wheels and axles, double acting power means mounted on each side frame outwardly thereof, fulcrum means mounted on each side frame inboard thereof at opposite sides of said bolster, and braking means for the wheels at each side of the truck comprising cylinder levers operatively connected at their outer ends to opposite ends of the power means and fulcrumed respectively at intermediate points from said frame, and hanger levers pivoted intermediate their ends from said fulcrum means respectively and connected at their upper ends to said cylinder levers respectively.

18. In a railway truck, spaced truss type side frames, a connecting bolster, supporting wheels and axles, double acting power means mounted on each side frame outwardly thereof, fulcrum means mounted on each side frame inboard thereof at opposite sides of said bolster, and braking means for the wheels at each side of said truck comprising cylinder levers operatively connected at their outer ends to opposite ends of the adjacent power means, brake levers pivoted intermediate their ends from said fulcrum means and operatively connected at their upper ends to said cylinder levers respectively, and brake heads and brake shoes supported on said brake levers.

19. In a railway truck, spaced truss type side frames and a connecting bolster, supporting wheel and axle assemblies, each of said frames comprising a tension member, a compression member and integral columns forming a bolster opening, double acting power means mounted on said compression member outwardly of said opening, and braking means for the wheels at one side of the truck comprising cylinder levers fulcrumed on said compression member and operatively connected at opposite ends of said power means, and brake levers fulcrumed intermediate their ends from said frame and operatively connected respectively to said cylinder levers.

20. In a railway truck, spaced truss type side frames and a connecting bolster, supporting wheel and axle assemblies, each of said frames comprising a tension member, a compression member and integral columns forming a bolster opening, double acting power means mounted on each compression member outwardly of said opening, and braking means for said wheels comprising cylinder levers fulcrumed on said compression member and operatively connected at opposite ends of adjacent power means, and brake levers fulcrumed from said frame and operatively connected respectively to said cylinder levers.

WALTER H. BASELT.